United States Patent
Kadohiro et al.

[11] Patent Number: 6,101,869
[45] Date of Patent: Aug. 15, 2000

[54] AIR FLOW RATE MEASURING DEVICE FOR AN INTERNAL COMBUSTION ENGINE

[75] Inventors: Takashi Kadohiro, Hitachinaka; Tadao Suzuki, Hitachi; Mamoru Tsumagari, Minori-machi; Shinya Igarashi, Naka-machi, all of Japan

[73] Assignees: Hitachi, Ltd., Tokyo; Hitachi Car Engineering Co., Ltd., Hitachinaka, both of Japan

[21] Appl. No.: 08/721,040

[22] Filed: Sep. 26, 1996

[30] Foreign Application Priority Data

Sep. 29, 1995 [JP] Japan ................................. 7-252410

[51] Int. Cl.⁷ ........................................ G01F 1/68
[52] U.S. Cl. .............................................. 73/118.2
[58] Field of Search ................. 73/202.5, 204.11, 73/204.22, 118.2, 115, 866.5

[56] References Cited

U.S. PATENT DOCUMENTS

| | | | |
|---|---|---|---|
| 4,878,386 | 11/1989 | Isobe et al. | 73/118.2 |
| 5,048,327 | 9/1991 | Atwood | 73/118.2 |
| 5,179,858 | 1/1993 | Atwood | 73/118.2 |
| 5,209,113 | 5/1993 | Sawada et al. | 73/118.2 |
| 5,369,990 | 12/1994 | Zurek et al. | 73/118.2 |
| 5,741,964 | 4/1998 | Mizutani | 73/118.2 |
| 5,803,608 | 9/1998 | Randoll et al. | 73/118.2 |

FOREIGN PATENT DOCUMENTS 4-212022   8/1992   Japan .

*Primary Examiner*—George Dombroske
*Attorney, Agent, or Firm*—Evenson, McKeown, Edwards & Lenahan, P.L.L.C.

[57] ABSTRACT

An air flow rate measuring device for an internal combustion engine is disclosed. The air flow rate measuring device has a casing provided downstream from an air cleaner element for purifying intake air to the internal combustion engine, a duct connected fluidly to and downstream from the casing, and an air flow meter provided in said duct, for measuring an air flow rate taken into the internal combustion engine. A cross-sectional area of a connection portion between the casing and the duct, taken perpendicularly to the direction of air flow is the minimum cross-sectional area in the duct.

13 Claims, 9 Drawing Sheets

314

AIR FLOW RATE MEASURING DEVICE FOR AN INTERNAL COMBUSTION ENGINE

BACKGROUND OF THE INVENTION

The present invention relates to an air flow rate measuring device for an internal combustion engine which measures the flow rate passing through an intake air passage in an intake system, and particularly to a thermal type of air flow rate measuring device.

In a prior art shown in Japanese Patent Application Laid-Open No. 4-212022, an air passage body in which an air flow rate measuring device is provided is divided from an air cleaner. Further, members which constitutes a sub-passage is integrated with the air passage body, and a driving circuit and the sub-passage in a module part is not integrated.

In the above prior art, since the air passage body and the air cleaner are not integrated, a lot of parts are required. Further, because the direction of air flow is not controlled, it is impossible to measure the air flow rate with high accuracy.

SUMMARY OF THE INVENTION

An object of the present invention is to provide a reasonable and highly accurate air flow rate measuring device.

To achieve the above object, the present invention has adopted the following ways.

(1) An air passage body in which an air flow rate measuring device is provided is formed integrally with an air cleaner case.
(2) A cross-sectional area of a duct takes on the minimum value at an entrance portion of the duct. By setting the dimensional tolerance of radius in the duct entrance portion, it is possible to suppress the deterioration of the accuracy of the air flow rate measuring device, which depends upon the change in the area of the air passage.
(3) It becomes easy to form a duct by providing an appropriate taper to it.
(4) It is possible to improve the easiness of the forming of the duct and the accuracy of the air flow rate measuring device by changing the angle of the taper of the duct from one position to another.
(5) By providing sub-passage for air on the side of the circuit module, it is possible to reduce the dependence of the accuracy of the air flow rate measuring device upon the shape of the duct, and provide a compact and easy-to-use air flow rate measuring device.

DESCRIPTION OF THE PREFERRED EMBODIMENTS

Embodiments of the present invention will be explained hereinafter with reference to drawings.

Figure 1:
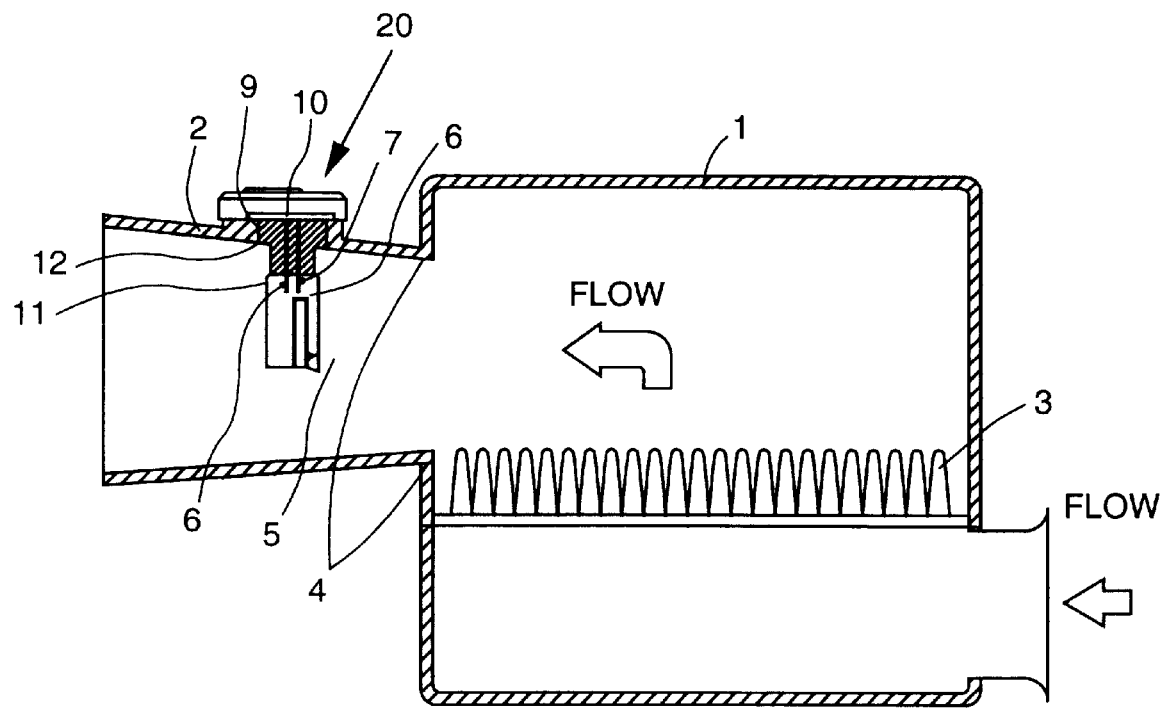
FIG. 1 is a schematic view showing an embodiment of an air flow rate measuring device according to the present invention.

FIG. 1 shows an embodiment of an air flow rate measuring device according to the present invention. An intake air flows from an entrance portion of an air cleaner, through an air cleaner element 3, an air main-passage 5 of a duct 2 in which the air flow meter module is provided and an air sub-passage 6 provided in the air flow meter module 20, to an internal combustion engine (not shown). In the air sub-passage 6, there are provided a heating resistor 7 and a temperature-sensitive resistor 8. These resistors 7 and 8 are connected electrically to a driving circuit 10. The driving circuit 10 outputs a signal corresponding to the measured air flow rate on the basis of output signals from these resistors 7 and 8.

The duct 2 for mounting the air flow meter module 20 has the minimum cross-sectional area at a connection portion 4 connected to an air cleaner casing 1. Because the connection portion 4 is entirely surrounded by the air cleaner case, heat contraction, drop, etc. are less than those of a normal piping after molding and dimensional stability after molding is better. Because characteristics of the air flow rate measuring device are susceptible to change in the cross-sectional area of an air passage, it is effective to set the connection portion to the minimum cross-sectional area. It is required to take drawing taper when a mold is formed. Therefore, the taper is provided such that the area of the air passage is gradually expanding along with the direction of air flow. In this case, sharp taper introduces the disturbance of air due to an expansion passage and the pressure loss. Accordingly, it may be desirable that the expansion of the taper is as small as possible.

Figure 2:
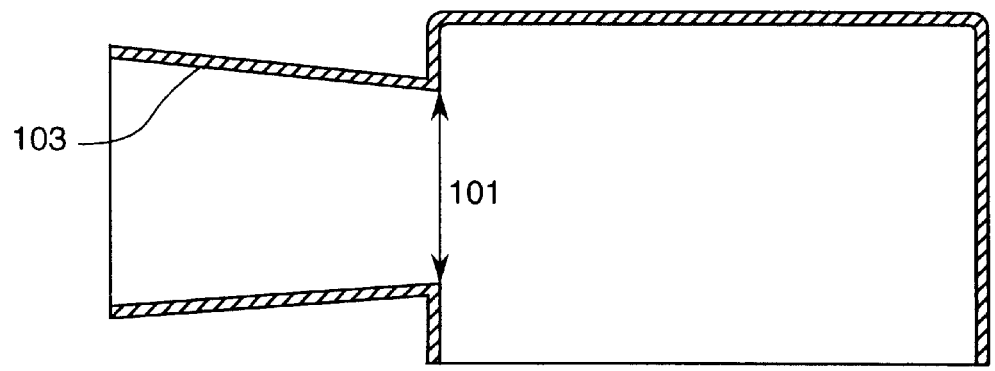
FIG. 2 is a schematic view showing a case of the air cleaner used in the embodiment of FIG. 1.
Figure 3:
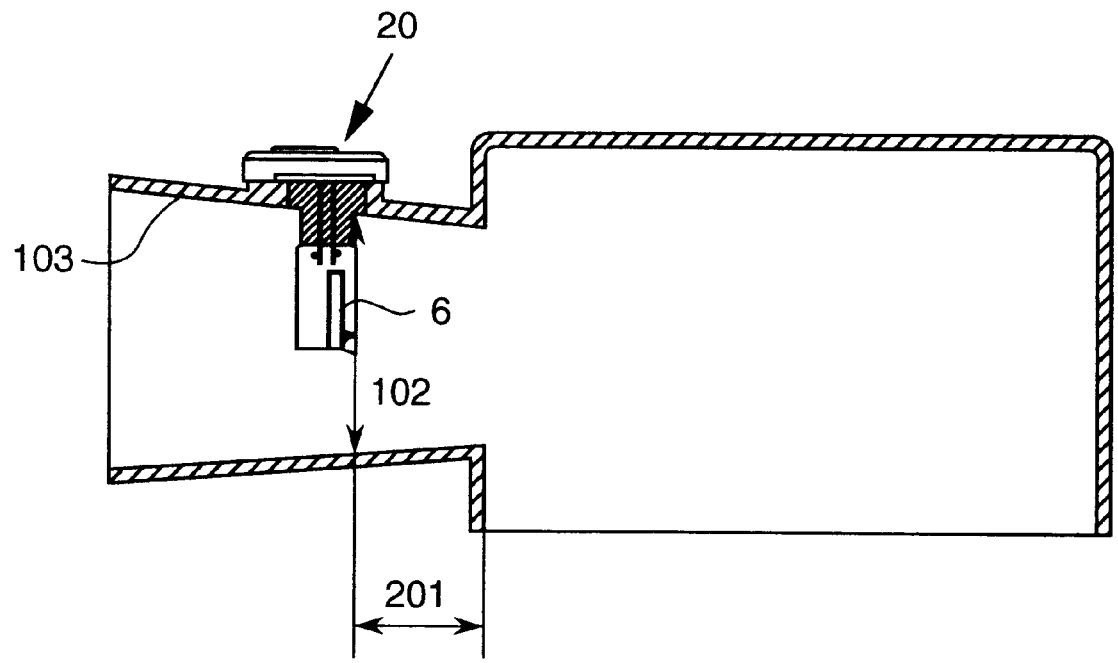
FIG. 3 is a schematic view showing a portion of the air flow rate measuring device of FIG. 1.

FIG. 2 is a schematic view showing a case of the air cleaner used in the embodiment of FIG. 1, in which the cross-sectional area of the entrance portion 101 of the duct 103 is the minimum cross-sectional area in the duct 103. FIG. 3 is a schematic view showing a portion of the air flow rate measuring device of FIG. 1, in which an air flow meter module is inserted into the duct 103. In FIG. 3, the cross-sectional area of the duct at the position where the air flow meter module 6 is inserted is the minimum cross-sectional area in the duct 103.

In order to speed up the air flow at the entrance of the air sub-passage 6 and thereby improve the accuracy of the air flow rate measuring device, it is required to set the minimum cross-sectional area in the duct to the position where the air flow meter module. Further, it is possible to reduce the effect of the air disturbance which occurs at the entrance of the duct, by providing the air sub-passage at a position at least 30 mm away from the connection portion of the duct.

Figure 4:
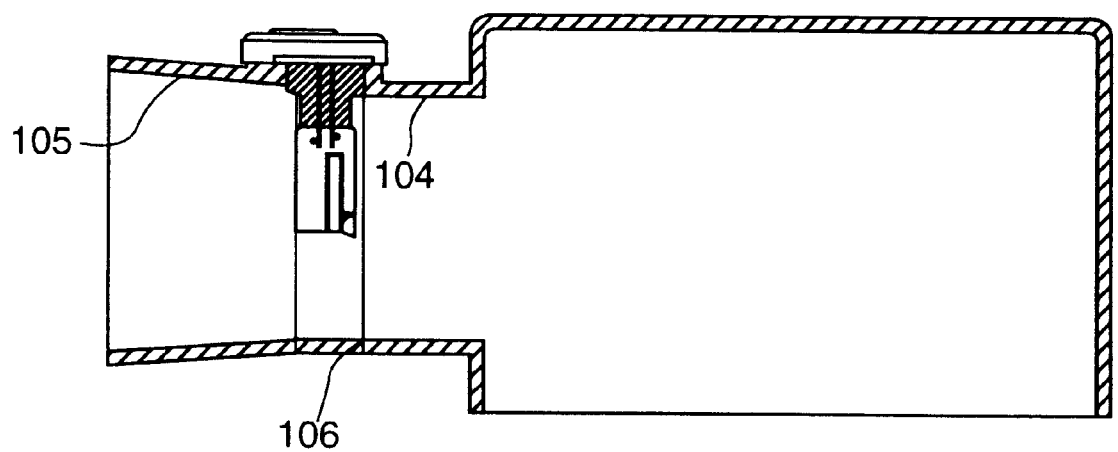
FIGS. 4 and 5 show examples of the position where the expansion taper of a duct is provided.
Figure 5:
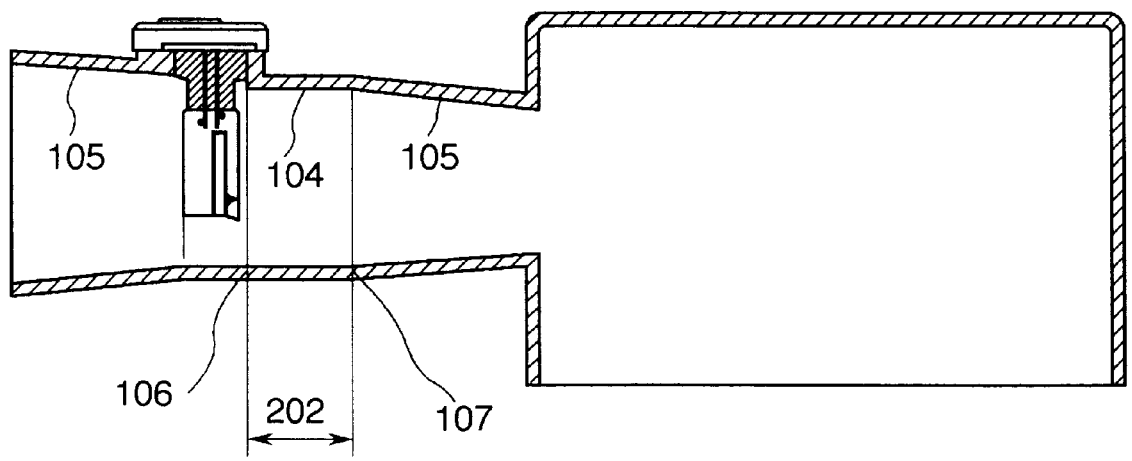

FIGS. 4 and 5 show examples of the position where the expansion taper (gradually expanded taper) of the duct is provided.

Referring to FIG. 4, in order to reduce remarkably the effect of the expansion taper when the position where the air sub-passage is provided is relatively near the entrance of the duct, it is effective to set the expansion taper from the duct entrance to the position of the air sub-passage to 0.2–1.0, and set that from the position of the air sub-passage to its downstream side to more than 1.5. In case that the position where the air sub-passage is provided is relatively far from the duct entrance as shown in FIG. 5, if the expansion taper from the duct entrance to the position of the air sub-passage is small, galling may occur when the mold is formed. Accordingly, it is desirable not to lessen extremely taper but provide taper easy to perform pattern-draw at a position less than 20 mm upstream of the air sub-passage. As described hereinbefore, by changing the magnitude of the taper in the duct, it is possible to produce a product taken into consideration both of the accuracy of the air flow rate measuring device and the forming of the air cleaner case.

Figure 6:
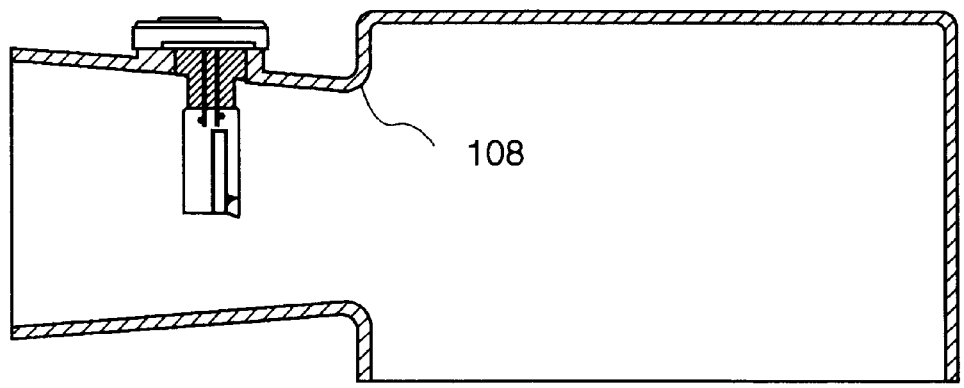
FIG. 6 is a schematic view showing a further embodiment of the air flow rate measuring device according to the present invention.
Figure 7:
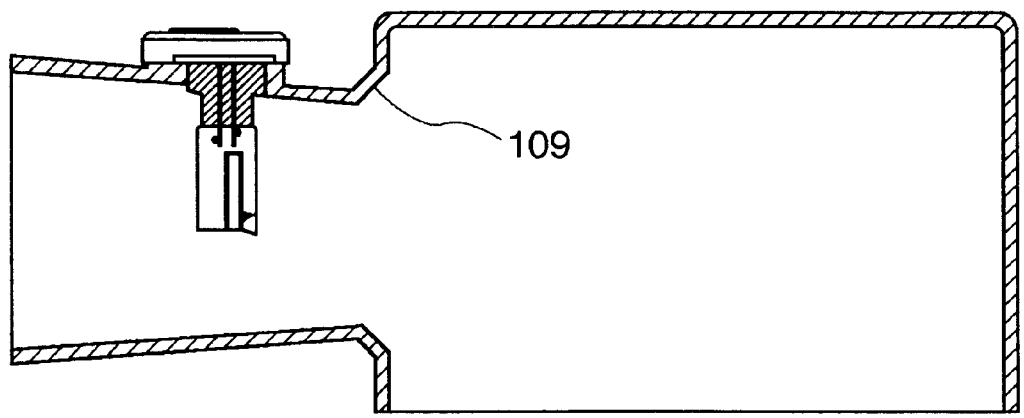
FIG. 7 is a schematic view showing a further embodiment of the air flow rate measuring device according to the present invention.

FIGS. 6 and 7 are schematic views each showing a further embodiment of the air flow rate measuring device according to the present invention.

By performing the corner-processing R (108) and the chamfer C (109) at the connection portion of the duct, it becomes possible to reduce the disturbance of the air which occurs at the entrance of the duct, an output noise and a pressure loss. If the corner-processing R and the chamfer C are less than R5 and C5, respectively, it is very difficult to obtain such the effects. It is preferable to perform the corner-processing, in particular, for an air cleaner such that an air passage curves many times.

Figure 8:
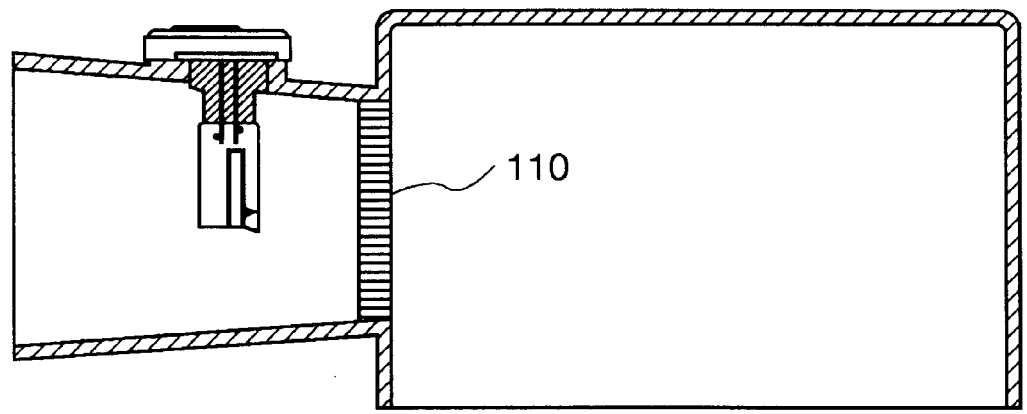
FIG. 8 is a schematic view showing a further embodiment of the air flow rate measuring device according to the present invention.
Figure 9:
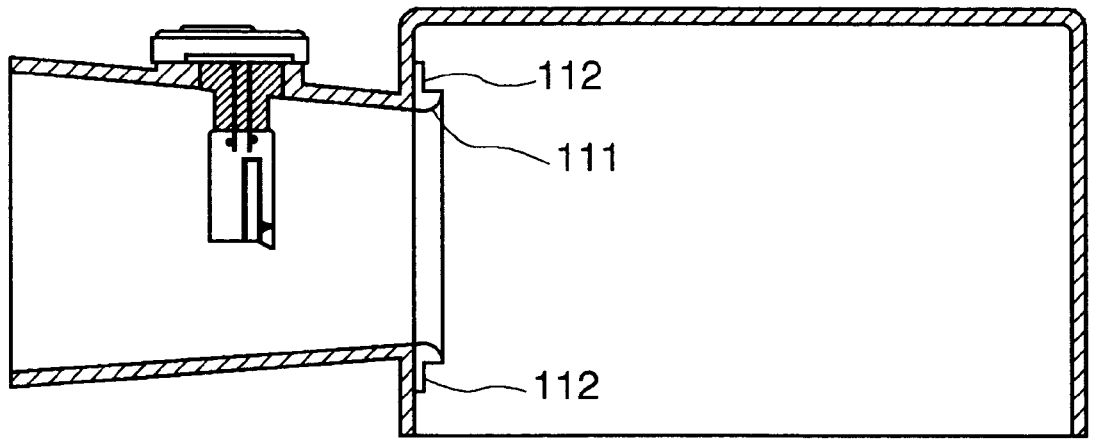
FIG. 9 is a schematic view showing a further embodiment of the air flow rate measuring device according to the present invention.
Figure 10:
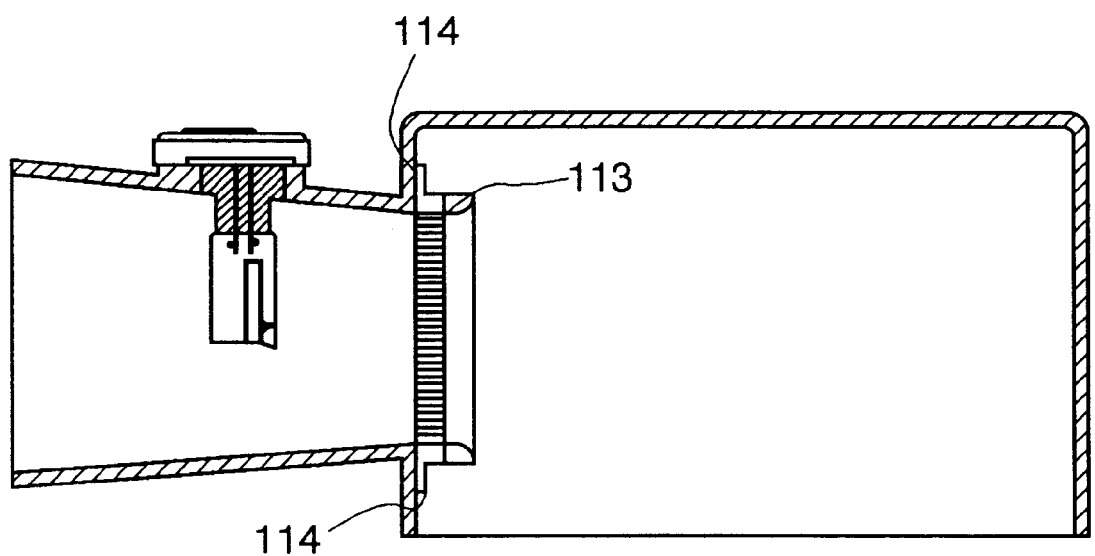
FIG. 10 is a schematic view showing a further embodiment of the air flow rate measuring device according to the present invention.

FIGS. 8, 9 and 10 are schematic views each showing a further embodiment of the air flow rate measuring device. In FIG. 8, a control grid such as a mesh and a honeycomb is provided to control a direction of an air flow. By providing the control grid, it becomes possible to control the direction of the air flow, and thereby reduce the disturbance of air and the output noise. As shown in FIG. 9, it may provide a bell-mouth 111 to obtain the same effects as above. Because it is difficult to form integrally the bell-mouth with the air cleaner in case that the bell-mouth is provided, the bell-mouth may be fixed to the air cleaner by screws 112 after molding.

By integrating the bell-mouth with the control grid as shown in FIG. 10, it becomes possible to obtain an control effect larger than that of a normal control grid. Because such the integration can be carried out by using plastic members, it is possible to decrease the number of parts. Further, in such an air cleaner case made of plastic material, it becomes possible to fix by using a bonding method such as ultrasonic welding and adhesion. As a result, the productivity can be improved and the production cost can be extremely reduced.

Figure 11:
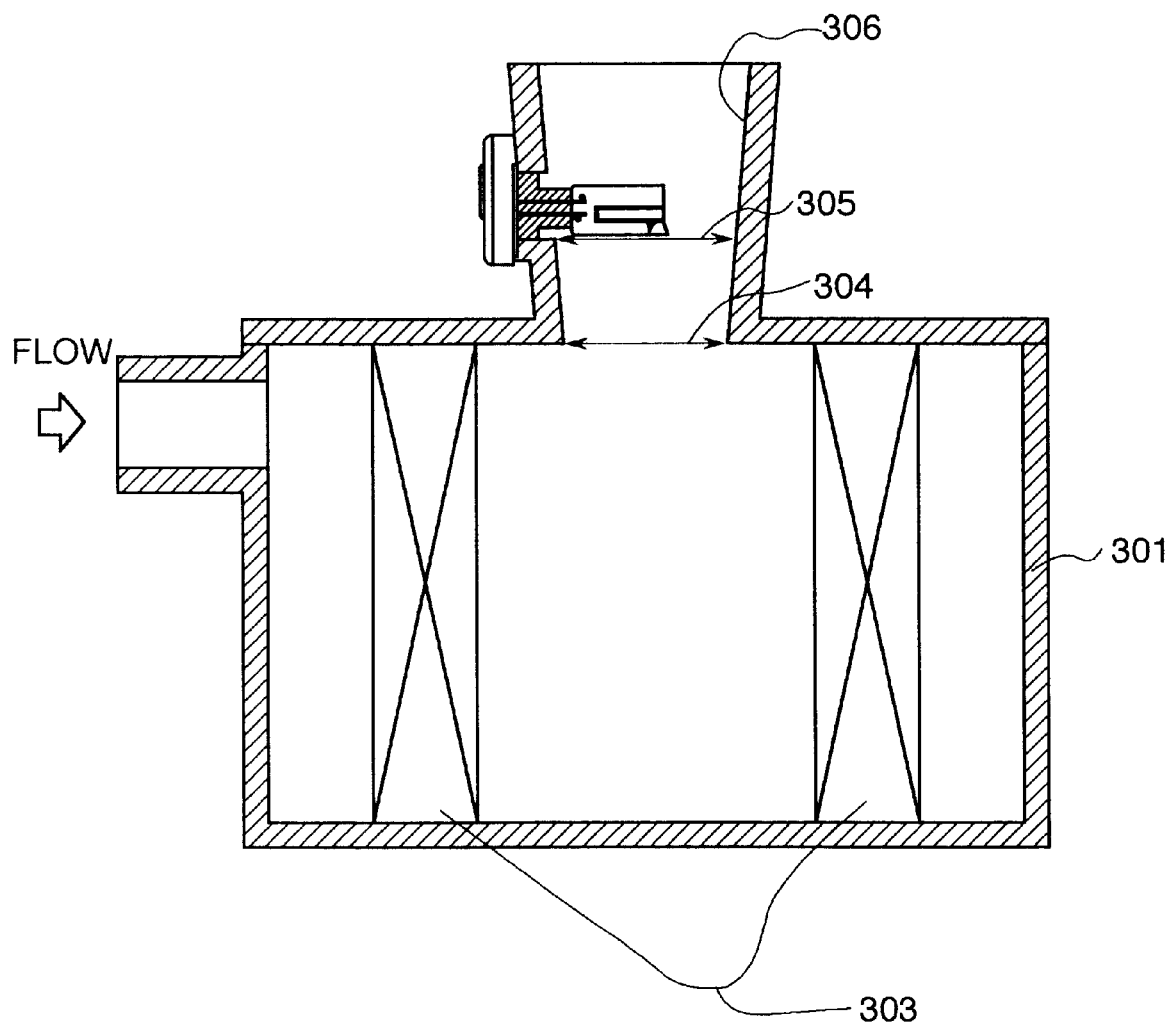
FIG. 11 is a schematic view showing a further embodiment of the air flow rate measuring device applied to a cyclone type of air cleaner.

FIG. 11 is a schematic view showing an embodiment of the air flow rate measuring device applied to a cyclone type of air cleaner. In the cyclone type of air cleaner, air is generally supplied from an entrance designated by an arrow, through air cleaner elements 303 and an expansion taper 306 of the duct in which the air flow meter module is provided, to an internal combustion engine (not shown). Also in this embodiment, by setting the cross-sectional area of the entrance portion 304 of the duct to the minimum cross-sectional area in the duct before providing the air sub-passage, and by setting the cross-sectional area (305) of the duct at a position where the air sub-passage is provided to the minimum cross-sectional area in the duct, it can obtain the same effects as the embodiment shown in FIG. 1. Further, by forming the taper such that the magnitude of the taper around the position where the air sub-passage is provided is different from that at another position, it is possible to improve the accuracy of the air flow rate measuring device and the easiness of the forming of the duct as in the case of the above-described embodiment.

Figure 12:
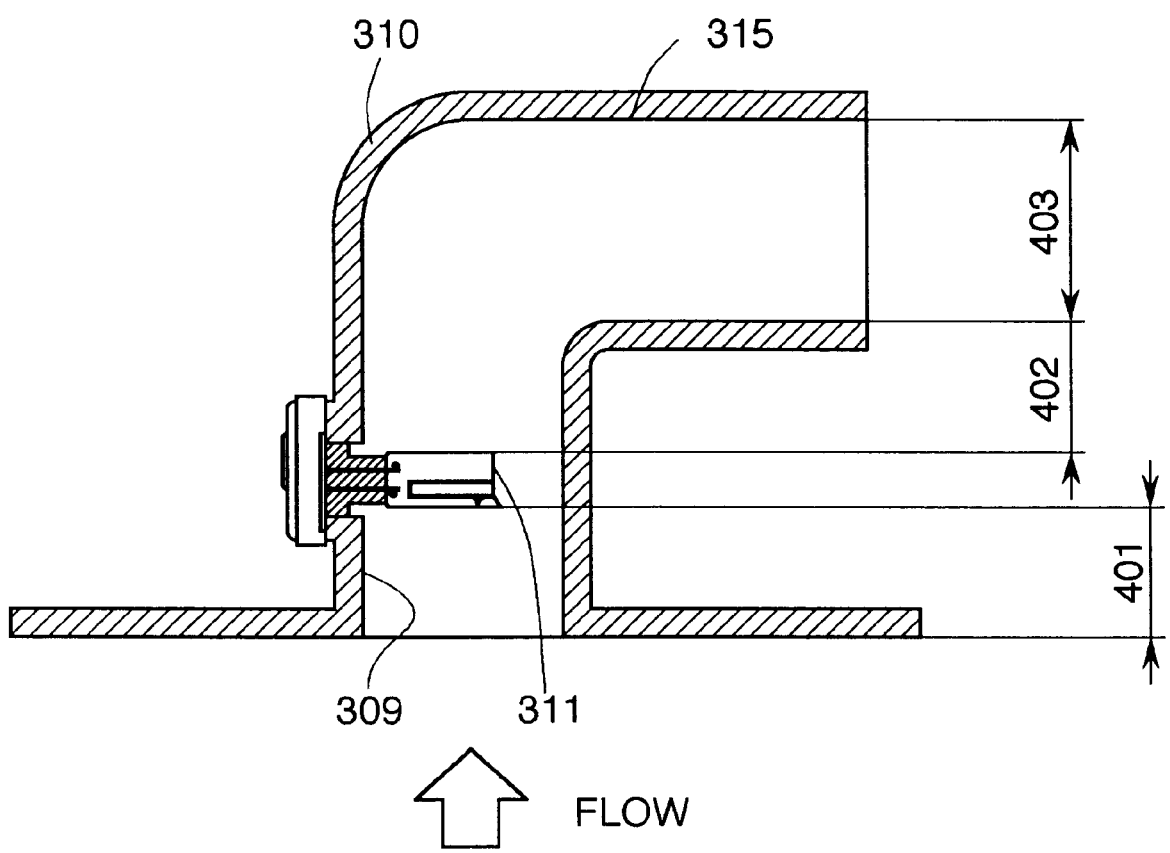
FIGS. 12 and 13 are schematic views each showing a further embodiment of the air flow rate measuring device applied to the cyclone type of air cleaner in which a curved duct is used.
Figure 13:
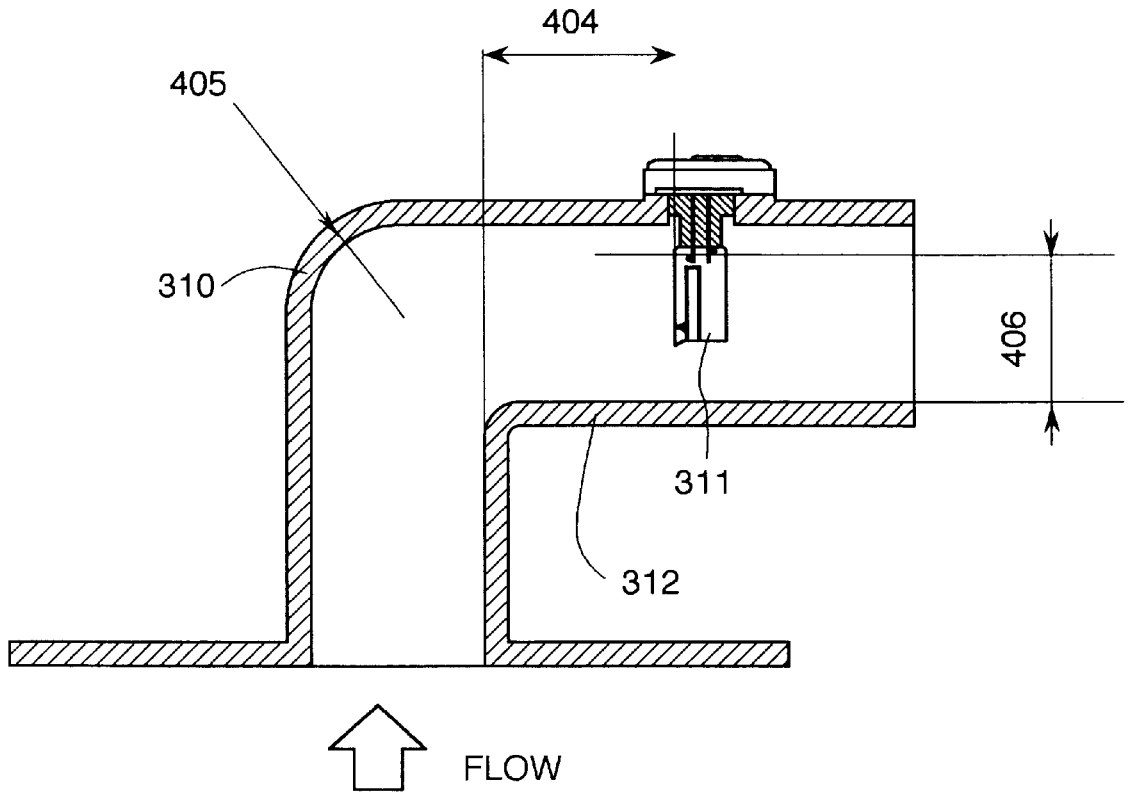

FIGS. 12 and 13 are schematic views each showing a further embodiment of the air flow rate measuring device applied to the cyclone type of air cleaner in which a curved duct is used. An air flow meter module is provided upstream of a curved portion 310 in the embodiment of FIG. 12. On the other hand, it is provided downstream of the curved portion in the embodiment of FIG. 13. In the embodiment of FIG. 12, it is possible to make the most of air flow control effects of the air cleaner elements, and thereby reduce remarkably the output noise. Further, by providing the entrance portion of the air sub-passage more than 20 mm away from the duct entrance, it becomes possible to reduce the effect of the disturbance of air due to the loss at the duct entrance. In addition, by providing the entrance portion of the air sub-passage more than the sum of the diameter (403) of the duct and 20 mm (402) away from the inner wall 315 of the duct downstream of the curved portion 310, it becomes possible to reduce some effects occurred by the pulsation of the internal combustion engine, and prevent the counter flow occurred by the pulsation of the engine from flowing into the air sub-passage through its exit portion 311. Referring now to FIG. 13, because the disturbance of air occurred due to the curved portion of the duct has effect on the accuracy of measurement of the air flow rate measuring device in this embodiment, it is required to pay attention to where the air sub-passage is provided to. In particular, the curvature R (405) of the outside of the curved portion 310 and the distance (404) from the rising upstream of the curved portion to the entrance of the air sub-passage have large effect on characteristics of the air flow rate measuring device. It is, therefore, necessary to predetermine their dimension. It is desirable to set the curvature R as large as possible, or more than at least R15. Further, it is also desirable to set the distance (402) as large as possible, in order to control effectively the air flow, or more than 20 mm. There is some cases in which it is difficult to satisfy the above dimension in actual design. Should it is impossible to satisfy the above dimension, it is possible to improve the accuracy of measurement and reduce the output noise by providing the entrance portion of the air sub-passage at a position closer to a position where the speed of the air flow is faster. From the above-described point of view, it is preferable to provide the entrance portion of the air sub-passage outside the center of the curved portion 310.

Figure 14:
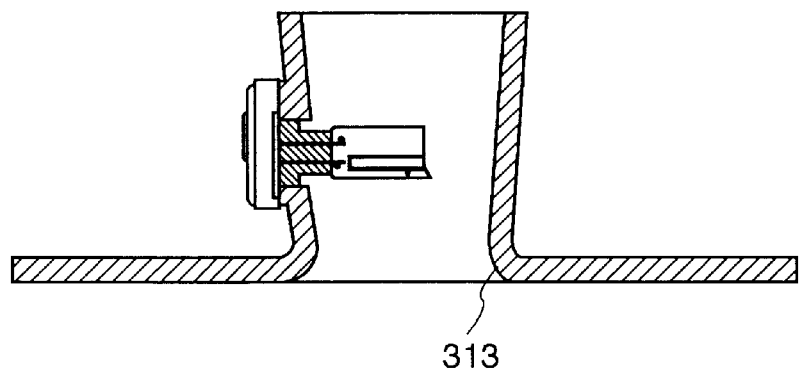
FIGS. 14 and 15 are schematic views each showing a further embodiment of the air flow rate measuring device applied to the cyclone type of air cleaner, in which the corner-processing or the chamfer is performed.
Figure 15:
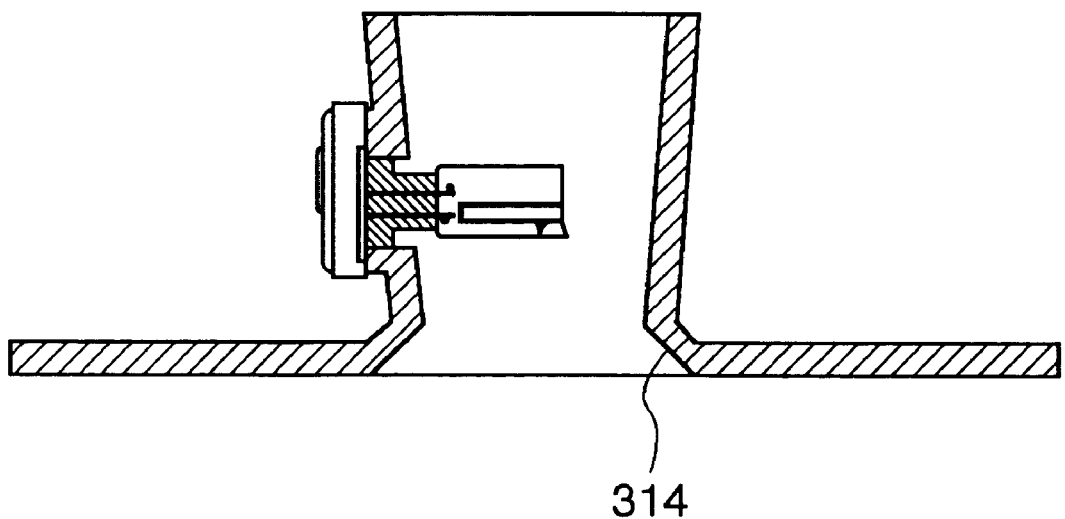

FIGS. 14 and 15 are schematic views each showing a further embodiment of the air flow rate measuring device applied to the cyclone type of air cleaner, in which the corner-processing 313 or the chamfer 314 is performed. Also in these embodiment, it becomes possible to improve the accuracy of measurement and reduce the disturbance of air flow by performing the corner-processing 313 (see FIG. 14) or the chamfer 314 (see FIG. 15) around the entrance portion of the duct.

What is claimed is:

1. An air flow rate measuring device for an internal combustion engine comprising:

an air flow meter module in which an air flow rate detector and a driving circuit are integrated, the air flow rate detector detecting an air flow rate taken into the internal combustion engine and the driving circuit being connected to said air flow rate detector for outputting an signal corresponding to the measured air flow rate, an air flow meter body which constitutes an intake air passage for the internal combustion engine, said air flow meter module being mounted in said body such that the air flow rate detector can be arranged in the intake air passage, wherein said air flow meter body comprises a casing of which one end is connected fluidly to an air cleaner element, and a duct with a module mounting member connected to the other end of the casing, and wherein a flow cross-sectional area of a connection portion between the casing and the duct completely upstream of the air flow meter module, taken perpendicularly to the direction of air flow, is the minimum cross-sectional area in the duct.

2. An air flow rate measuring device for an internal combustion engine according to claim 1, wherein an air sub-passage is fixed to said air flow meter module in such a way that the air flow rate detector can be exposed to the air which flows through the air sub-passage, and wherein the cross-sectional area of the duct taken perpendicularly to the direction of air flow takes on the minimum value at the connection portion of the duct, when said air flow meter module with the air sub-passage is not provided, and the cross-sectional area takes on the minimum value at the duct portion where the air sub-passage is provided, when said module with the air sub-passage is provided.

3. An air flow rate measuring device for an internal combustion engine according to claim 1, wherein the duct has such taper that the radius of the duct expands gradually toward the downstream side of air flow, the taper from the connection portion of the duct to the position where the air flow meter module is mounted being smaller than the taper at the downstream side of the position where the air flow meter module is provided.

4. An air flow rate measuring device for an internal combustion engine according to claim 1, wherein the duct has such taper that the radius of the duct expands gradually toward the downstream side of air flow, the taper around the position where the air flow meter module is provided being smaller than the taper from the connection portion of the duct to the position where the air flow meter module is mounted and the taper at the downstream side of the position where the air flow meter module is mounted.

5. An air flow rate measuring device for an internal combustion engine according to claim 1, wherein an air flow controlling grid is provided at the entrance portion of the duct.

6. An air flow rate measuring device for an internal combustion engine according to claim 1, wherein a bell-mouth for controlling the air flow is provided at the entrance portion of the duct in such a way that the bell-mouth is projected into a space formed downstream of the air cleaner element.

7. An air flow rate measuring device for an internal combustion engine according to claim 1, wherein an air sub-passage is fixed to said air flow meter module in such a way that the air flow rate detector can be exposed to the air which flows through the air sub-passage, and wherein the cross-sectional area of the duct taken perpendicularly to the direction of air flow takes on the minimum value at the connection portion of the duct, when said air flow meter module with the air sub-passage is not provided, and the cross-sectional area takes on the minimum value at the duct portion where the air sub-passage is provided, when said module with the air sub-passage is provided.

8. An air flow rate measuring device for an internal combustion engine according to claim 1, wherein the duct has such taper that the radius of the duct expands gradually toward the downstream side of air flow, the taper from the connection portion of the duct to the position where the air flow meter module is mounted being smaller than the taper at the downstream side of the position where the air flow meter module is provided.

9. An air flow rate measuring device for an internal combustion engine according to claim 1, wherein the duct has such taper that the radius of the duct expands gradually toward the downstream side of air flow, the taper around the position where the air flow meter module is provided being smaller than the taper from the connection portion of the duct to the position where the air flow meter module is mounted and the taper at the downstream side of the position where the air flow meter module.

10. An air flow rate measuring device for an internal combustion engine comprising:

an air flow meter module in which an air flow rate detector and a driving circuit are integrated, the air flow rate detector detecting an air flow rate taken into the internal combustion engine and the driving circuit being connected to said air flow rate detector can be arranged in the intake air passage, wherein said air flow meter body comprises a casing of which one end is connected fluidly to an air cleaner element, and a duct with a module mounting member connected to the other end of the casing, the duct being formed integrally with the casing, and wherein a flow cross-sectional area of a connection portion between the casing and the duct completely upstream of the air flow meter module, taken perpendicularly to the direction of air flows is the minimum cross-sectional area in the duct.

11. An air flow rate measuring device for an internal combustion engine comprising;

a casing, a duct connected fluidly to and downstream from said casing, and an air flow meter provided in said duct for measuring an air flow rate taken into the internal combustion engine, wherein a flow cross-sectional area of a connection portion between said casing and said duct completely upstream of the air flow meter, taken perpendicularly to the direction of air flow, is the minimum cross-sectional area in said duct.

12. An air flow rate measuring device for an internal combustion engine according to claim 11, in which said duct is formed integrally with said casing.

13. An air cleaner having an air flow rate measuring device for an internal combustion engine comprising:

a casing provided downstream from an air cleaner element for purifying intake air to the internal combustion engine, a duct connected fluidly to and downstream from said casing, and an air flow meter provided in said duct, for measuring an air flow rate taken into the internal combustion engine, a flow cross-sectional area of a connection portion between said casing and said duct completely upstream of the air flow meter, taken perpendicularly to the direction of air flow being the minimum cross-sectional area in said duct.

* * * * *